US011544775B2

(12) United States Patent
Warrington et al.

(10) Patent No.: US 11,544,775 B2
(45) Date of Patent: Jan. 3, 2023

(54) SYSTEM AND METHOD FOR VIRTUAL DEMONSTRATION OF PRODUCT

(71) Applicant: Inter Face IP Limited, Preston (GB)

(72) Inventors: Stuart Ian Warrington, Leeds (GB); Michael Robert Nisbet, Leeds (GB); Connor Alex Newton, Leeds (GB)

(*) Notice: Subject to any disclaimer, the term of this patent is extended or adjusted under 35 U.S.C. 154(b) by 218 days.

(21) Appl. No.: 17/004,433

(22) Filed: Aug. 27, 2020

(65) Prior Publication Data

US 2022/0067820 A1 Mar. 3, 2022

(51) Int. Cl.
*G06Q 30/06* (2012.01)
*H04L 67/141* (2022.01)
*H04L 67/01* (2022.01)

(52) U.S. Cl.
CPC ......... *G06Q 30/0643* (2013.01); *H04L 67/01* (2022.05); *H04L 67/141* (2013.01)

(58) Field of Classification Search
CPC ............ G06Q 30/0641–30/0643; H04L 67/01–67/141
See application file for complete search history.

(56) References Cited

U.S. PATENT DOCUMENTS

| | | | |
|---|---|---|---|
| 2012/0158473 A1 | 6/2012 | Cox et al. | |
| 2014/0363059 A1* | 12/2014 | Hurewitz | G06Q 30/0281 382/118 |
| 2015/0095808 A1 | 4/2015 | Fox et al. | |
| 2015/0310488 A1 | 10/2015 | Hess et al. | |
| 2016/0155187 A1* | 6/2016 | Paulrajan | G06Q 30/0643 705/27.2 |
| 2019/0066198 A1* | 2/2019 | Keeler | G06F 3/04815 |
| 2021/0004137 A1* | 1/2021 | Oser | G06F 3/04815 |

OTHER PUBLICATIONS

Jean Lehmann, "Virtual Meetings: Not Just An Option Anymore!", 2003, IEEE, pp. 443-447 (Year: 2003).*
Maestro, "8 Examples of Augmented Reality that Made an Impact", Maestro, Jul. 28, 2020, pp. 1-11 (Year: 2020).*
Godfrey, "5 Ways to Retrofit Your B2B Product Demos for the Age of Social Distancing", Apr. 10, 2020, Godfrey, pp. 1-5 (Year: 2020).*
International Search Report and Written Opinion of the International Searching Authority issued in International Patent Application No. PCT/IB2021/057784 dated Nov. 30, 2021, 13 pages.
Office of Information Technology, Southern Illinois University, published "Getting started with Microsoft teams", on Mar. 26, 2020, pp. 1-58. URL: https://oit.siu.edu/crc/_common/documents/training-files/microsoft-teams-training-guide.pdf.

* cited by examiner

*Primary Examiner* — Clayton R Williams
(74) *Attorney, Agent, or Firm* — RC Trademark Company (57) ABSTRACT

Disclosed is a system and method for virtual demonstration of a product. Herein, a game engine is implemented to provide a virtual environment with a model of the product. Further, a library of predefined story blocks related to the model of the product is provided. A session for virtual demonstration of the product is initiated by a master server over a network, with at least one server acting as a host server associated with a host user and one or more of other servers acting as one or more client servers with each of the one or more client servers being associated with a client user. The host server is configured to allow the host user to define a timeline with one or more story blocks. The one or more client servers are configured to present the defined timeline for viewing of the one or more client users associated therewith.

18 Claims, 7 Drawing Sheets

SYSTEM AND METHOD FOR VIRTUAL DEMONSTRATION OF PRODUCT

TECHNICAL FIELD

The present disclosure relates generally to product demonstration for customers; and more specifically to a system and a method for virtual demonstration of the product over a network and managing of users during the virtual demonstration of the product.

BACKGROUND

The main motive of every industry, no matter how big or small, is to increase sales of their products. This is accomplished by not only maintaining superior quality of products but by also employing proper sales techniques in selling these products. Traditionally, companies appoint a number of sales personnel trained to demonstrate their products to the customers. The sales personnel travel to customer sites, arrange meetings with the customers and demonstrate the products in order to lure the customers into buying them. Companies spend a lot of money on chasing sales by demonstrations and can create a large carbon footprint whilst doing so. However, under-qualified leads can cause revenue loss, extra travel costs and lost time for a business. Moreover, companies have to bear the cost incurred on training and maintaining these sales personnel. Furthermore, occurrence of a black-swan event, like a global pandemic, can cause interference in successful physical demonstrations via person-to-person meetings.

Businesses need a different, reliable platform to showcase or demonstrate their products in a way that allows the potential customer to get a real feel for the product, and further means to play with/examine its features without the need of the product having to travel to be physically present with the customer or the customer having to travel to the product in order to test it. This is especially true for companies with a wide geographical sales network, where it may be unfeasible or very expensive to recruit required number of sales personnel. These companies need to change their approach to demonstration of products, and can start utilizing technology to chase sales and save spending money they don't need to on travel and related expenses.

More and more companies are shifting from the conventional sales technique to online mode so as to combat the above described issues. Currently, video conferencing systems are the most widely used means for product demonstration. Traditionally, video conferencing systems employ a company representative to connect with the potential customers. Herein, the company representative demonstrates the product in action by physically manipulating it and demoing it in real time. However, the need of the company representative to physically manipulate the product puts a constraint on the employed demonstration technique as the product has to be physically present.

Therefore, in light of the foregoing discussion, there exists a need to overcome various problems associated with the virtual demonstration of a product, as known in the art.

SUMMARY

The inventors have also realized that the contemporary video conferencing systems does not allow the customer to manipulate the product itself and a customer wanting more details is forced to guide the sales representative orally to get the wanted details.

One object of the teachings herein is to overcome or at least mitigate the problems of the prior art.

The inventors have realized after inventive and insightful reasoning, that the current approaches to virtual demonstration of a product has certain limitations. The teachings of the present application aim to at least partially overcome or mitigate problems associated with prior-art, such as cost involved in physical demonstration of the product and unavailability of feature to allow customers to manipulate product while demonstrating product virtually. The present disclosure seeks to provide a system and a method for virtual demonstration of a product, and specifically addresses problems related to the involvement and management of users during virtual demonstration of the product. An aim of the present disclosure is to provide a solution that overcomes at least partially the problems encountered in prior art.

As a general aspect, the object is achieved by providing a system arranged for virtual demonstration of a product, the system comprising a master server configured to implement a game engine to provide a virtual environment with a model of the product and a plurality of servers in communication with the master server to initiate a session for virtual demonstration of the product over a network, wherein at least one server in the plurality of servers acts as a host server in the session, and one or more of other servers in the plurality of servers act as one or more client servers in the session, wherein the one or more client servers are configured to allow a client user to navigate the virtual environment independently of the host server.

According to one aspect, the object is achieved by providing a system for virtual demonstration of a product, the system comprising:
 a master server configured to implement a game engine to provide a virtual environment with a model of the product, the master server further configured to a provide a library of predefined story blocks related to the model of the product; and
 a plurality of servers in communication with the master server to initiate a session for virtual demonstration of the product over a network,
 wherein at least one server in the plurality of servers acts as a host server in the session with the host server being associated with a host user of the virtual demonstration of the product, and one or more of other servers in the plurality of servers act as one or more client servers in the session with each of the one or more client servers being associated with a client user in the virtual demonstration of the product,
 wherein the host server is configured to allow the host user to define a timeline with one or more story blocks from the library of predefined story blocks, and
 wherein the one or more client servers are configured to present the defined timeline for viewing of the one or more client users associated therewith and allow the client user to navigate one or more of the defined timeline and the virtual environment independently of the host server.

Embodiments of the present disclosure provides a system to allow for virtual demonstration of a product with a 3D model of the product placed in a 3D environment. Further, the system allows the user to interact with the product during the demonstration. The present system enables the client user to take control of the demonstration session with permission from the host. Therefore, the present system provides virtual demonstration of the product that gives a feel of physical demonstration by incorporating a variety of images, videos, information and animations in the 3D environment.

In an embodiment, the master server of the system is configured to:
- assign an open state to the one or more client servers registered on the network;
- assign a pending state to the one or more client servers requesting to join the session;
- assign a closed state to the one or more client servers having joined the session; and
- assign the open state to the one or more client servers when the session is terminated.

In an embodiment, the host server is configured to play the defined timeline. Further, the one or more client servers are configured to mirror the played timeline on the host server for viewing of the one or more client users associated therewith.

In an embodiment, each of the one or more client servers provide one or more graphical user interface (GUI) elements for the associated client user. The one or more GUI elements are dynamically adjusted based on the story block being currently presented in the timeline.

In an embodiment, the one or more GUI elements comprise one or more navigation controls configured to allow the client user to navigate one or more of the defined timelines and the virtual environment independently of the host server. Further, the master server is configured to disable the navigation controls in the one or more client servers.

In an embodiment, each of the one or more client servers is configured to allow the associated client user to request the master server to take control as a temporary host server for the session. Herein, the master server is configured to confirm with the host server to accept or deny the request from the client server.

In an embodiment, the host server is configured to allow the associated host to take back control for the session from the temporary host server.

In an embodiment, the host server is configured to allow the host user to input a remote call, with an action associated therewith, in the defined timeline during the session. Further, the one or more client servers are configured to execute the action corresponding to the inputted remote call in the presented timeline during the session.

In an embodiment, the action comprises one or more of focusing on a spot in the virtual environment with the model of the product, moving the camera to a fixed location in the virtual environment with the model of the product, displaying information and rich media related to the model of the product, and playing animation related to the model of the product.

In an embodiment, each of the one or more story blocks, in the defined timeline, is related to at least one hotspot in the model of the product. Herein, each of the one or more story blocks comprises one or more of: a focus view of the corresponding hotspot, a view with information about the corresponding hotspot, an interactive view to allow the associated client user to interact with the corresponding hotspot, and an animation view displaying one or more animations related to the corresponding hotspot.

In an embodiment, each of the plurality of servers is a virtual private server.

In an embodiment, the plurality of servers are part of Reliable Server Pooling (RSerPool) computer protocol framework.

In an embodiment, the game engine is a Unity game engine.

According to one aspect, the object is achieved by providing a method for virtual demonstration of a product, the method comprising:
- implementing a game engine to provide a virtual environment with a model of the product;
- providing a library of predefined story blocks related to the model of the product;
- initiating a session for virtual demonstration of the product over a network with a plurality of servers, wherein at least one server in the plurality of servers acts as a host server in the session with the host server being associated with a host user of the virtual demonstration of the product, and one or more of other servers in the plurality of servers act as one or more client servers in the session with each of the one or more client servers being associated with a client user in the virtual demonstration of the product,
- defining a timeline with one or more story blocks from the library of predefined story blocks, by the host user via the host server; and
- presenting the defined timeline for viewing of the one or more client users associated with the one or more client servers, such as to allow the client user to navigate one or more of the defined timeline and the virtual environment independently of the host server.

In an embodiment, the method further comprises:
- assigning an open state to the one or more client servers registered on the network;
- assigning a pending state to the one or more client servers requesting to join the session;
- assigning a closed state to the one or more client servers having joined the session; and
- assigning the open state to the one or more client servers when the session is terminated.

In an embodiment, the method further comprises playing the defined timeline by the host server and mirroring the played timeline on the host server by the one or more client servers for viewing of the one or more client users associated therewith.

In an embodiment, the method further comprises providing one or more graphical user interface (GUI) elements for the associated client user with each of the one or more client servers and dynamically adjusting the one or more GUI elements based on the story block being currently presented in the timeline.

In an embodiment, the method further comprises allowing the associated client user with each of the one or more client servers to request to take control as a temporary host server for the session and confirming with the host server to accept or deny the request from the client server.

Additional aspects, advantages, features and objects of the present disclosure would be made apparent from the drawings and the detailed description of the illustrative embodiments construed in conjunction with the appended claims that follow.

It will be appreciated that features of the present disclosure are susceptible to being combined in various combinations without departing from the scope of the present disclosure as defined by the appended claims.

BRIEF DESCRIPTION OF THE DRAWINGS

The summary above, as well as the following detailed description of illustrative embodiments, is better understood when read in conjunction with the appended drawings. For the purpose of illustrating the present disclosure, exemplary constructions of the disclosure are shown in the drawings. However, the present disclosure is not limited to specific methods and instrumentalities disclosed herein. Moreover, those skilled in the art will understand that the drawings are not to scale. Wherever possible, like elements have been indicated by identical numbers.

Embodiments of the present disclosure will now be described, by way of example only, with reference to the following diagrams wherein.

DETAILED DESCRIPTION

The following detailed description illustrates embodiments of the present disclosure and ways in which they can be implemented. Although some modes of carrying out the present disclosure have been disclosed, those skilled in the art would recognize that other embodiments for carrying out or practicing the present disclosure are also possible.

In one aspect, an embodiment of the present disclosure provides a system for virtual demonstration of a product, the system comprising:
- a master server configured to implement a game engine to provide a virtual environment with a model of the product, the master server further configured to a provide a library of predefined story blocks related to the model of the product; and
- a plurality of servers in communication with the master server to initiate a session for virtual demonstration of the product over a network,
- wherein at least one server in the plurality of servers acts as a host server in the session with the host server being associated with a host user of the virtual demonstration of the product, and one or more of other servers in the plurality of servers act as one or more client servers in the session with each of the one or more client servers being associated with a client user in the virtual demonstration of the product,
- wherein the host server is configured to allow the host user to define a timeline with one or more story blocks from the library of predefined story blocks, and
- wherein the one or more client servers are configured to present the defined timeline for viewing of the one or more client users associated therewith and allow the client user to navigate one or more of the defined timelines and the virtual environment independently of the host server.

In another aspect, an embodiment of the present disclosure provides a method for virtual demonstration of a product, the method comprising:
- implementing a game engine to provide a virtual environment with a model of the product;
- providing a library of predefined story blocks related to the model of the product;
- initiating a session for virtual demonstration of the product over a network with a plurality of servers, wherein at least one server in the plurality of servers acts as a host server in the session with the host server being associated with a host user of the virtual demonstration of the product, and one or more of other servers in the plurality of servers act as one or more client servers in the session with each of the one or more client servers being associated with a client user in the virtual demonstration of the product,
- defining a timeline with one or more story blocks from the library of predefined story blocks, by the host user via the host server; and presenting the defined timeline for viewing of the one or more client users associated with the one or more client servers, such as to allow the client user to navigate one or more of the defined timeline and the virtual environment independently of the host server.

The present disclosure relates to a system and a method for virtual demonstration of a product. The objective of the present disclosure is to demonstrate a product virtually that gives a real feel of the product by incorporating 3D world and by allowing the client to play with it. The system and the method of the present disclosure is used virtual demonstration of a product.

Figure 1:
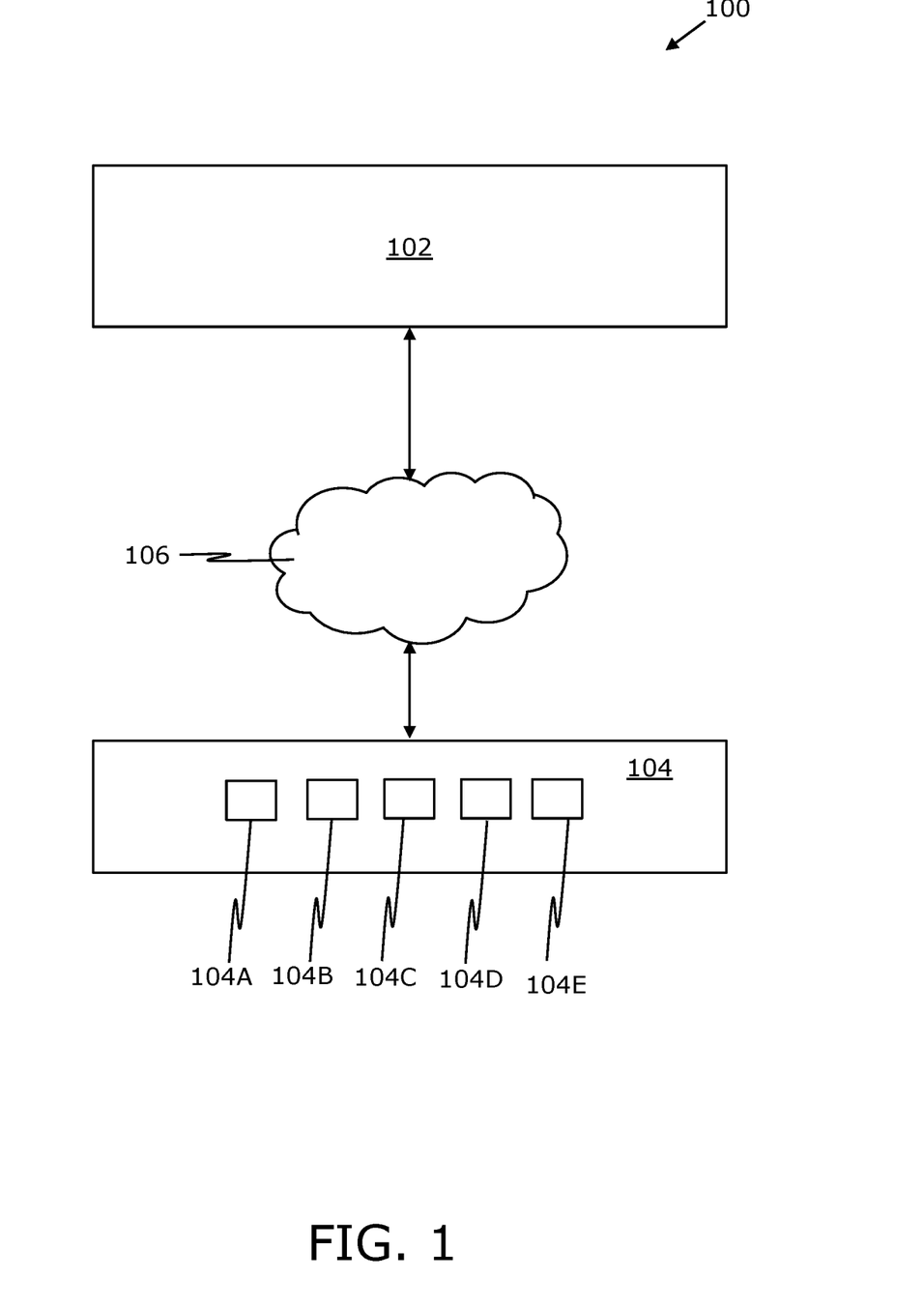
FIG. 1 is a block diagram illustration of a system for virtual demonstration of a product, in accordance with an embodiment of the present disclosure.

Referring to FIG. 1, there is shown a block diagram illustration of a system 100 for virtual demonstration of a product, in accordance with an embodiment of the present disclosure. The system 100 comprises a master server 102 and a plurality of servers 104. In the illustrated example, the plurality of servers 104 has been shown to include five servers 104A, 104B, 104C, 104D and 104E; however, it may be appreciated that the number of servers 104 may be more or less depending on the requirement for the virtual demonstration of the product. The plurality of servers 104 are in communication with the master server 102 to initiate a session for virtual demonstration of the product over a network 106.

Throughout the present disclosure, the term "product" relates to any object or device which may need to be showcased for selling purposes. As used herein, the term "product" has been interchangeably used with the term "service," as the present invention is applicable to all kinds of products and services that can be demonstrated. The term "virtual demonstration" refers to exhibiting the product not physically, but virtually by means of software programmes. Herein, the product to be sold is displayed virtually to the customer. It may be understood that, many a time, physically demonstrating the product may not possible. For example, in pandemic like situation when traveling of sales representatives to customers may be restricted, the physical exhibition of product is not possible. In such situations, those customers may be lost leading to substantial loss in revenue. In order to tackle this, the system for virtual demonstration of a product comes into play. The product demonstrations are usually employed by the companies and are provided by host (salespeople) to give clients (prospect customers) an overview of various features of the product. The virtual demonstration provides an opportunity to show off how the product looks like and/or what the product does, and also get the customers excited about the product increasing chance of sale. For the purposes of the present disclosure, the virtual demonstration can be pre-recorded or delivered in real time, without any limitations.

The term "server" as used herein refers to a computer system including a processor, data storage and a network adapter generally configured to provide a service over the computer network. A computer system which receives a service provided by the server may be known as a "client" computer system. Further, a "network" is defined as any architecture where two or more computer systems may exchange data. The term "network" may include wide area network, Internet local area network, Intranet, wireless networks such as "Wi-fi", virtual private networks, mobile access network using access point name (APN) and Internet. Exchanged data may be in the form of electrical signals that are meaningful to the two or more computer systems. When data is transferred or provided over a network or another communications connection (either hardwired, wireless, or a combination of hardwired or wireless) to a computer system or computer device, the connection is properly viewed as a computer-readable medium. Thus, any such connection is properly termed a computer-readable medium. Combinations of the above should also be included within the scope of computer-readable media. Computer-executable instructions comprise, for example, instructions and data which cause a general-purpose computer system or special-purpose computer system to perform a certain function or group of functions.

The master server 102 is configured to implement a game engine to provide a virtual environment with a model of the product. Herein, the term "game engine" should be understood as including a software component of a computer or video game with real-time graphic ability. Typically, the game engine includes several components like a rendering engine, also referred to as a "renderer", for rendering 2D or 3D graphics in real-time. The game engine also includes an animation engine which is adapted to create the illusion of movement of an animated object. Furthermore, a game engine may include a physics engine which simulates Newtonian (or other) physics models so that simulated objects behave like obeying the laws of physics. In particular, physics engines may include a manipulation detection and, optionally, also a manipulation response functionality to handle user's interaction with the product during the virtual demonstration of the product. The game engine also includes a scene graph which is a logical and/or spatial representation of a graphical scene. For example, a scene graph may be a collection of nodes in a graph or tree structure representing entities or objects in the scene. It should be understood by those skilled in the art that the above list of game engine elements is not exhaustive and further elements may be included.

The master server 102, by implementing the game engine, renders the required graphics to provide the model of the product and the virtual environment for virtual demonstration of the product. Herein, the 3D model of the product may be generated by a CAD software or the like. Further, certain features such as, but not limited to, backgrounds, animations, graphics required for generating the virtual environment may already be incorporated in the game engine. It may be contemplated that when a new game is being developed, the developer uses the features of the game engine directly into the game rather than writing a code for each element of the game, to save time and energy. Similarly, in the context of this application, the game engine helps to render the virtual environment with the 3D model of the produced to be demoed therein, and takes care of rendering the changes to the 3D model of the product as well as the virtual environment, when the model of the product is manipulated and/or when the virtual environment is manipulated during the virtual demonstration of the product, without the need of pre-programming each aspect.

In many cases, the game engine provides a suite of visual development tools, in addition to reusable software components, in an integrated development environment to enable simplified, rapid development of the virtual demonstration in a data-driven manner. For example, if the product is a "car" and for the purposes of the virtual demonstration of the car, a model of the car needs to depicted in a showroom setting for a real life feel, instead of capturing video and/or images of the car in a physical showroom, the game engine may be used to virtually place the model of the car in a virtual environment resembling the showroom setting. Herein, the showroom setting may be in the form of a background already existing in a library of in the game engine.

In an embodiment, the game engine is a Unity (also known as Unity3D) game engine. Unity game engine is a platform developed by Unity technologies. It may be used to create three-dimensional games, two-dimensional games, virtual games, augmented-reality games and computer simulations. Unity game engine allows for multi-platform exploitation or support, including Win32, Xbox 360, Windows Phone 7, PS3, iOS, Android etc. In alternative examples, the master server 102 may implement some other compatible game engine, such as Unreal 3 or some 2D game engine (such as Cocos2D which is a 2D game engine of iOS platform), without departing from the scope and the spirit of the present disclosure.

The master server 102 is further configured to a provide a library of predefined story blocks (depicted in reference to FIG. 2, as explained later) related to the model of the product. Herein, the "story blocks" refers to discrete content blocks which are pre-built or pre-programmed, and stored as asset packages. These story blocks are loaded during the virtual demonstration of the product as and when needed. The discrete story blocks may include title of the product and its various components, detailed information about the product and its various components, hotspots on the product, animations for various mechanisms of the product, images for different views of the product, and the like. As will be discussed later in detail, a host of the virtual demonstration selects which story blocks from the library of predefined story blocks to be used for a particular session of the virtual demonstration of the product.

As discussed, and may be contemplated, the virtual demonstration of the product is led by a host for perusal of one or more prospective clients. Herein, at least one server in the plurality of servers 104 acts as a host server (such as, the server 104A) in the session. The host server 104A is associated with a host user of the virtual demonstration of the product. The host user is a representative of the company intending to showcase the product. The host user, via the host server 104A, design, execute and control the virtual demonstration of the product. In some implementations, there may be multiple hosts, and in such case, the corresponding number of the servers 104 are implemented as host server without any limitations. Further, one or more of other servers in the plurality of servers 104 act as one or more client servers (such as, the servers 104B-104E) in the session. Each of the one or more client servers 104B-104E is associated with a client user in the virtual demonstration of the product. The client users are prospective clients/customer viewing the virtual demonstration of the product. The client servers 104B-104E may be linked to or associated with client user's personal terminals or devices, such as their smartphone, personal computer, tablet computer, TV screen or the like, so as to enable the client users to participate in the virtual demonstration of the product.

Optionally, each of the plurality of servers 104 is a virtual private server. Virtual private server (VPS) is a way of converting one physical machine into a number of virtual machines with each virtual machine being configured to be operated independently of others. Partitioning a single server to appear as multiple virtual servers has been increasingly common in applications involving multiple users. The physical server typically runs a hypervisor which is tasked with creating, releasing, and managing the resources of "guest" operating systems, or virtual machines. These guest operating systems are allocated a share of resources of the physical server, typically in a manner in which the guest is not aware of any other physical resources save for those allocated to it.

Optionally, the plurality of servers 104 is part of Reliable Server Pooling (RSerPool) computer protocol framework. RSerPool is a computer protocol framework for management of and access to multiple, coordinated (pooled) servers. It is designed to build systems providing highly available services by mechanisms and protocols for establishing, configuring, accessing and monitoring pools of server resources. Using RSerPool, critical infrastructure services like telecommunication systems, e-commerce transaction processing or distributed computing can be provided highly available using pools of unreliable servers. RSerPool computer protocol framework is used to control, manage and access the multiple pooled servers 104 to provide cost-effective solution for the virtual demonstration of the product.

As discussed, the plurality of servers 104 communicates with the master server 102 over the network 106 in order to start the session for virtual demonstration of the product. In the present embodiments, the network 106 acts a work group server in which almost all data is shared between the servers. The implemented Unity game engine provides a Forge networking package which supports such configuration; however, for the purposes of the present disclosure it is not used, as the Forge networking package being mostly designed for game networks also simultaneously executes other parts of the Unity game engine such as physics calculations, which is not required in current application of virtual demonstration of the product. Herein, the network 106 may be implemented as a standalone server program in the master server 102, which works independently and is separate from the game engine implemented therein. The present implementation of the network 106 being the standalone server program is advantageous as it gives much better overhead on resources of the virtual private servers. Moreover, herein, the plurality of servers 104 is modified to run in a pooling system that dynamically expands when there is increased demand, up to the limits of the host user. In an implementation, the maximum number of servers from the plurality of servers 104 that may be joined in a session for virtual demonstration of a product over the network 106 is sixty-four; however, such number may be increased or decreased if required.

Figure 2:
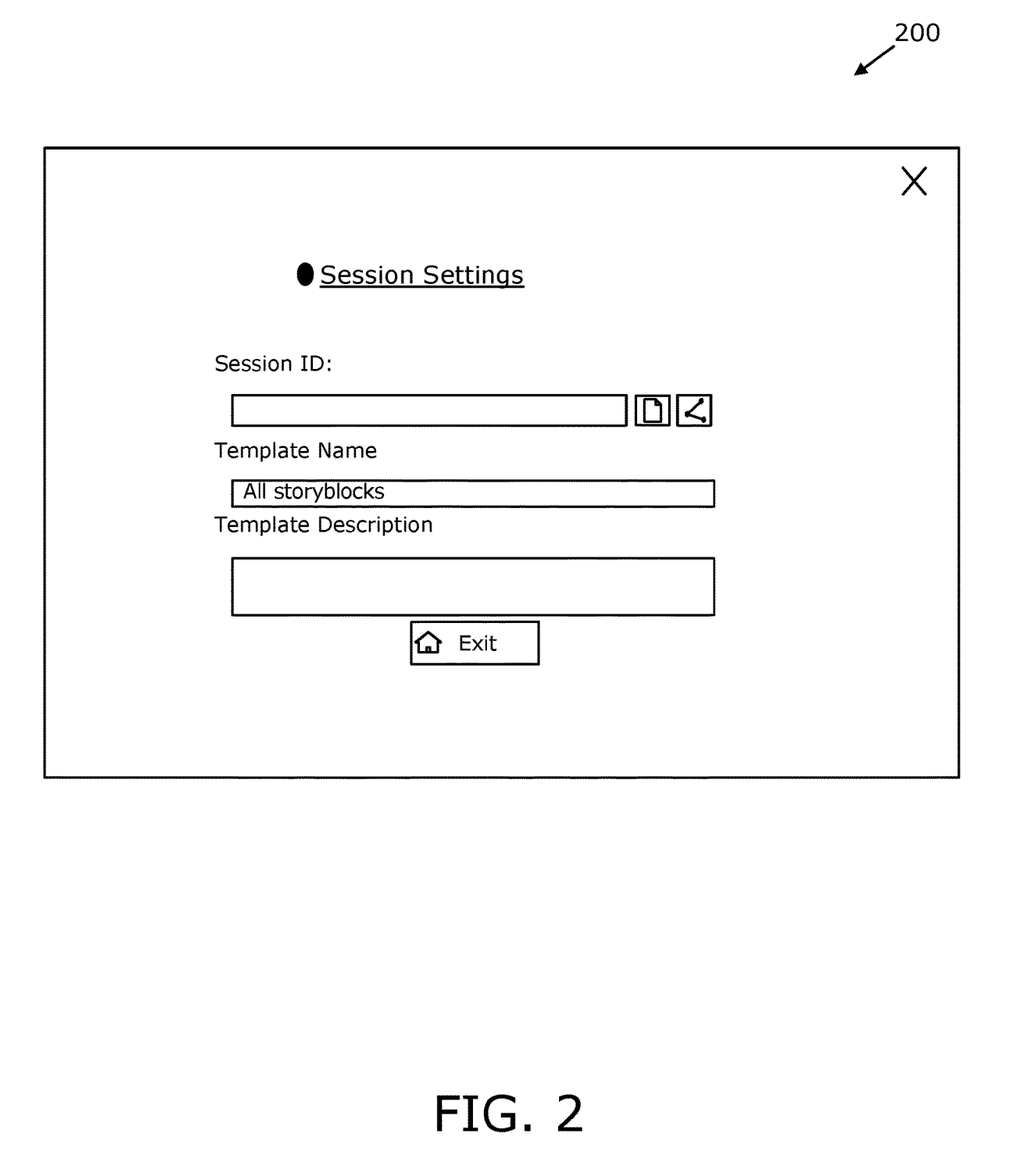
FIG. 2 is an illustration of an exemplary graphical user interface for initiating session by a host user for virtual demonstration of a product, in accordance with an embodiment of the present disclosure.

Referring to FIG. 2, there is an illustration of an exemplary graphical user interface (GUI) 200 for initiating session by a host user for virtual demonstration of a product, in accordance with an embodiment of the present disclosure. As the host user joins the host server 104A via the GUI 200, a host user's ID is generated which is shared with the host user and is further stored in the master server 102 for reference of the client servers 104B-104E that are in pending state. The host user starts the session by entering the host ID, a template name and a template description. The template name may include a name of the product and the template description may include the description of the product to be virtually demonstrated. As discussed, subsequently, when the client servers 104B-104E are ready, a session key is generated by the host server 104A and sent to the client servers 104B-104E, marking the session as live.

In an implementation, the master server 102 and the plurality of servers 104 may be executed in the form of an application programming interface (API). In an example, a fast API, such as a python package or the like built around an OpenAPI 3.0 specification for machine-readable interface files may be utilized by using OAuth2 for authentication. This provides representational state transfer (RESTful) web services for the application. The RESTful web service is used as it is easy, maintainable and scalable. Herein, the application database may be supplied by a MySQL instance. In the present implementation, the servers 104 may generally be interfaced with an app, which may be logged in through a computer or cell phone.

In an embodiment, the master server 102 is configured to assign an open state to the one or more client servers 104B-104E registered on the network 106, assign a pending state to the one or more client servers 104B-104E requesting to join the session, assign a closed state to the one or more client servers 104B-104E having joined the session, and assign the open state to the one or more client servers when the session is terminated. That is, each of the one or more client servers 104B-104E is assigned one of the three states, namely the open state, the closed state and the pending state. As discussed, the client servers 104B-104E communicates with the master server 102, which is the reference point for the application to select an empty server. When any one of the client servers 104B-104E registers on the master server 102 it is set assigned the open state. The host user looking to host the session through the host server 104A can retrieve a list of all servers with the open state from the master server 102. Any client user willing to join the sessions request to associate its devices with any one of the client servers 104B-104E with the open state. When the request is received and the client user joins, the client user is associated with one of the client servers 104B-104E and the corresponding client server is moved to the pending state. The corresponding client server is simultaneously delisted from the list of servers with the open state from the master server 102 in order to prevent any other client user to be associated therewith. After the host user joins the host server 104A, a host user's ID is generated and stored for reference in the client servers that are in pending state. When the session is to start, a session key is generated by the host server 104A and sent to the joined client servers, marking the session as live. Upon receipt of the session key, each of the currently joined client server sends the session key (or its acknowledgment) to the master server 102 and the master server 102 assign the closed state to those client servers. From that point, the client server's details can only be retrieved from the listings of the master server 102 if any of the client user or the host user sends the same session key when requesting for the client server. When the host disconnects the session from the host server 102, the master server 102 disconnects all joined client servers and assign those the open state.

The host server 104A is configured to allow the host user to define a timeline with one or more story blocks from the library of predefined story blocks. As discussed, in order to demonstrate the product, the master server 102 provides the library of predefined story blocks. The host server 104A allows the host user to select the story blocks to be used to define the timeline in a particular session of the virtual demonstration of the product. That is, the timeline is combination of story blocks arranged in a certain manner by the host user to define the timeline in a particular session of the virtual demonstration of the product. The timeline is custom built by the host user using the story blocks depending on the product and the client users involved. For instance, the product may be a model of car and the defined story blocks could be about, but not limited to, an exterior body of the car, an interior body of the car, an infotainment system of the car and an engine of the car. The host user may define the timeline of the story blocks with the story block about exterior body being arranged first, followed by the story block about the engine, then the story block about the interior body, and subsequently the story block about the infotainment system. In some implementations, the selected story blocks are arranged in a hierarchy, and the defined timeline follows the hierarchy. In the present implementations, the host server 104A enables the story blocks to be executed independent of each other. This is done to create bespoke sales pitches for the client users.

The one or more client servers 104B-104E are configured to present the defined timeline for viewing of the one or more client users associated therewith and allow the client user to navigate one or more of the defined timeline and the virtual environment independently of the host server 104A. As discussed, the host user, via the host server 104A, defines the timeline with one or more story blocks. Further, the host user, via the host server 104A, starts a session with the defined timeline for virtual demonstration of the product. In the present embodiments, the host server 104A is configured to play the defined timeline. The one or more client servers 104B-104E are configured to mirror the played timeline on the host server for viewing of the one or more client users associated therewith. That is, the host sever 104A plays the defined timeline which is propagated and re-played to the one or more client servers 104B-104E. The host server 104A achieves this by inputting (initiating) a remote call. In this way, the host server 104A controls the one or more client servers as to what the associated host user may view.

Figure 3:
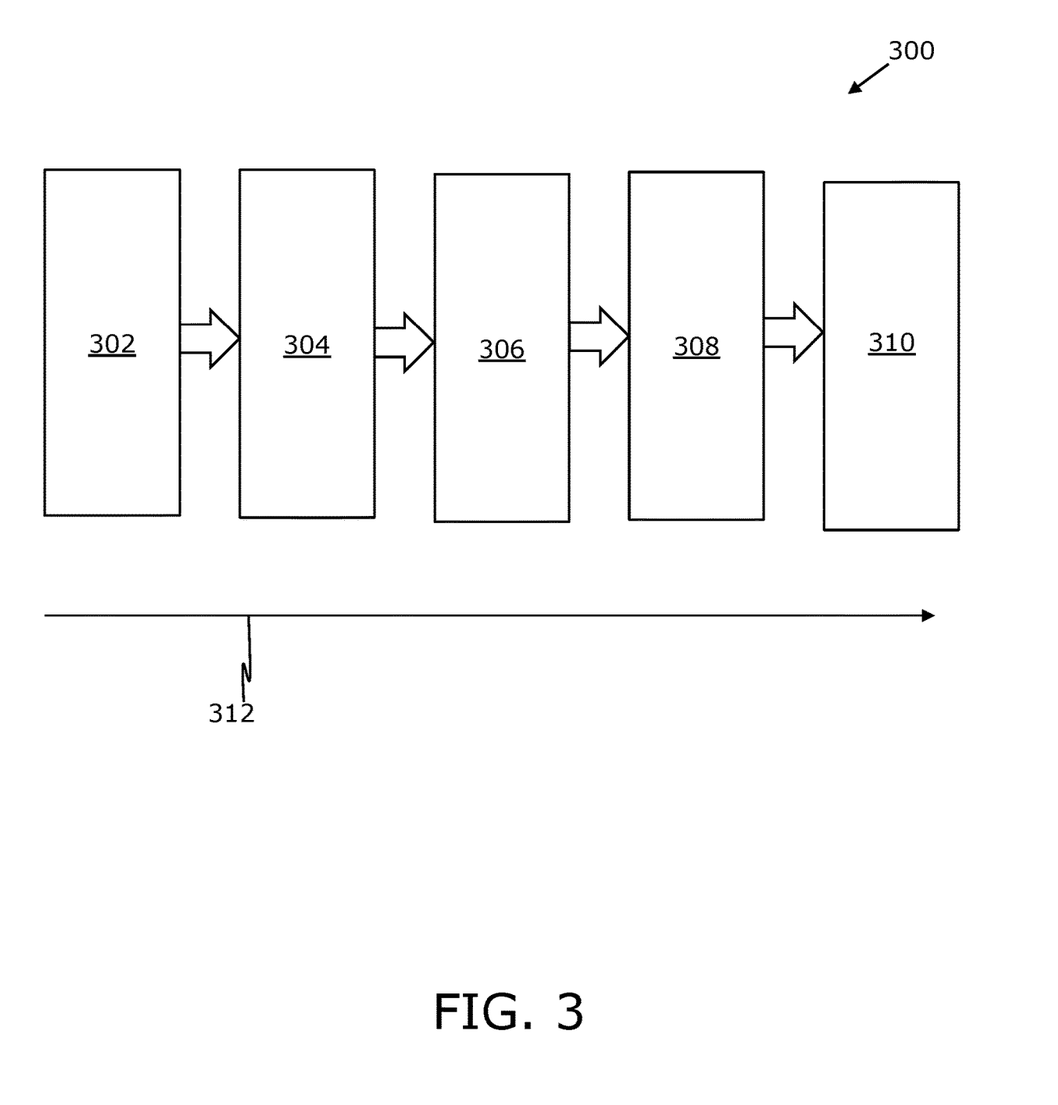
FIG. 3 is a block diagram illustration of a defined timeline as implemented in the system for virtual demonstration of a product, in accordance with an embodiment of the present disclosure.

Referring to FIG. 3, there is shown a block diagram illustration of a defined timeline 300 for virtual demonstration of a product, in accordance with an embodiment of the present disclosure. The defined timeline 300 includes a first story block 302, a second story block 304, a third story block 306, a fourth story block 308 and a fifth story block 310. The story blocks 302-310 are played sequentially in the direction of arrow 312 (as shown) to execute the timeline 300. That is, the first story block 302 is played first, next the second story block 304 is played, further the third story block 306 is played, subsequently the fourth story block 308 is played and finally the fifth story block 310 is played.

Figure 4:
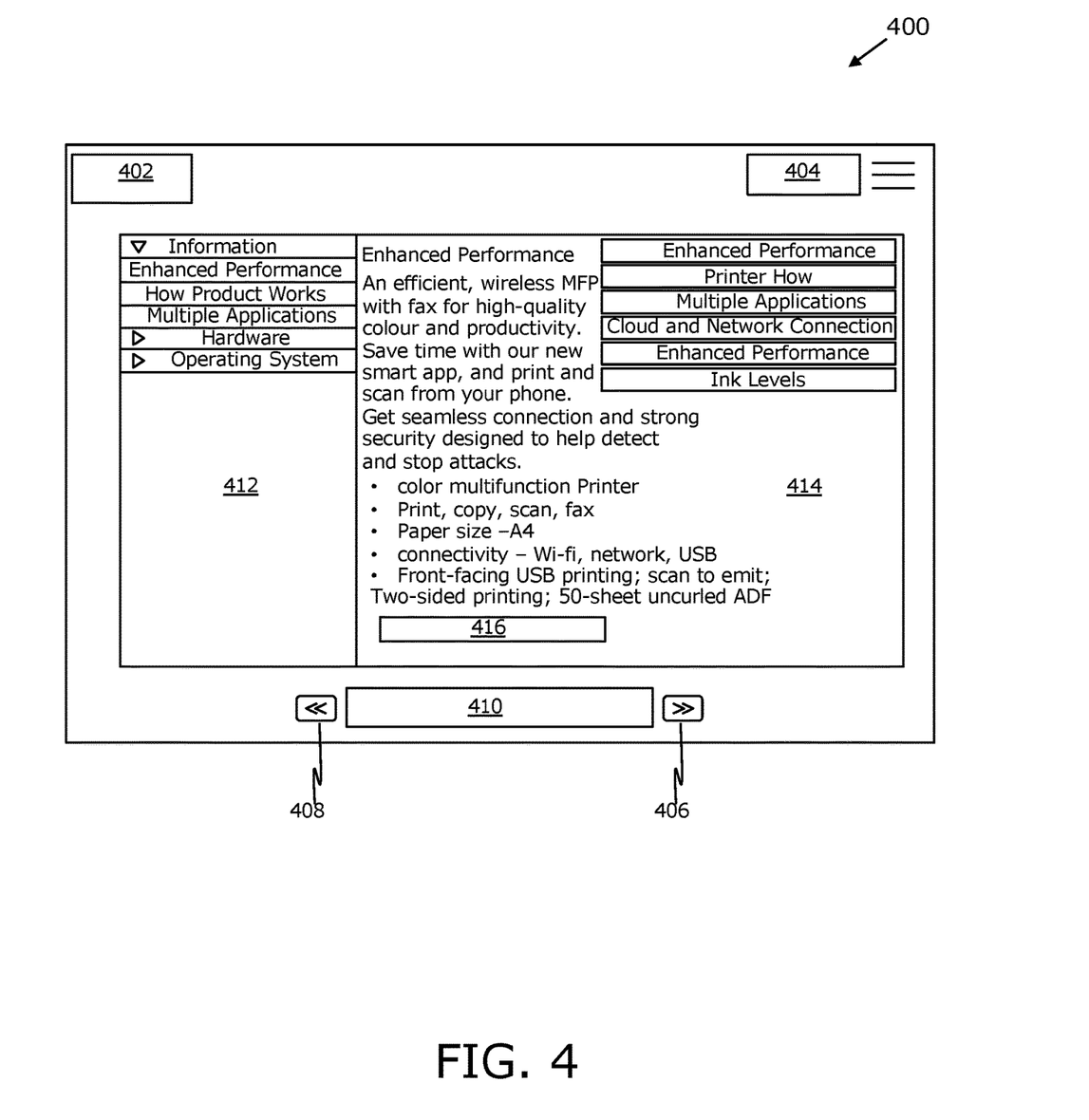
FIG. 4 is an illustration of an exemplary graphical user interface to allow the host server for building a timeline for virtual demonstration of a product, in accordance with an embodiment of the present disclosure.

Referring to FIG. 4, there is an illustration of an exemplary graphical user interface (GUI) 400 to allow the host server (such as, the host server 104A) for building the timeline (such as, the timeline 300) for virtual demonstration of a product, in accordance with an embodiment of the present disclosure. In the exemplary illustration of FIG. 4, the depicted product is a printer. The GUI 400 of the host server provides a first button 402, a second button 404, a forward button 406, a backward button 408, a navigation bar 410, a first panel 412, a second panel 414 and a timeline bar 416. The first button 402 may be labeled as "Close Editor" and is configured to close the GUI 400 when clicked, to move to a default GUI or the like. The second button 404 is configured to reset the view of the GUI 400. The forward button 406 is implemented to fast forward the timeline being played on the host server. The backward button 408 is implemented to move backwards in the timeline being played on the host server. The navigation bar 410 is implemented to go to the desired story block in the timeline by dragging the bar 410 from left to right, or vice-versa. The first panel 412 provides headings of the library of predefined story blocks. In the illustrated example, the story blocks are divided into three parts, namely "Information," "Hardware" and "Operating System." All the three parts are shown to be further divided categorically. For example, the "Information" block is further divided into "Enhanced Performance," "How Product Works" and "Multiple Applications." The story blocks may be selected from these headings and sub-categories to define the timeline. The second panel 414 provides some shortcuts related to the library of predefined story blocks 412. Instead of finding the story blocks categorically from the first panel 412, the host user can quickly select those from the second panel 414 directly. After the story blocks have been selected, those are added to the timeline bar 416 to define the timeline. Herein, the forward button 406, the backward button 408, the navigation bar 410 and the timeline bar 416 are used as navigation controls, as discussed later in more detail.

In an embodiment, each of the one or more client servers 104B-104E provide one or more graphical user interface (GUI) elements for the associated client user. The one or more GUI elements are dynamically adjusted based on the story block being currently presented in the timeline. As used herein, the graphical user interface (GUI) is a visual interface to help humans connect with the electronic devices, such as, computers and smart phones. Herein, instead of using textual commands for interaction; GUI elements, such as, buttons, bars, icons, menus, etc. are used. In the present embodiments, each of the story block in the defined timeline have their own set of GUI elements. As discussed, the story blocks are demonstrated as per the defined timeline. Some of the GUI elements may be common for all of the story blocks while others may be context dependent as per the current story block being played in the timeline. When a story block has been viewed and the next story is being viewed, the GUI elements associated with the former story block which may no longer required may be disabled and only the GUI elements relevant for the current story block are enabled.

Optionally, the one or more GUI elements comprise one or more navigation controls configured to allow the client user to navigate one or more of the defined timeline and the virtual environment independently of the host server 104A, and wherein the master server 102 is configured to disable the navigation controls in the one or more client servers 104B-104E. The GUI elements associated with each story block aid in browsing of that story block. Herein, the client user may browse and move between different sections of the story blocks by just selecting one of the GUI elements. Apart from this GUI elements, particularly the navigation controls, help the client user to navigate from one story block to another story block independent of the host user, if desired. The navigation control may in the form of buttons with arrows to indicate forward or backward movement and/or a bar which may be dragged to move within the timeline. For instance, when the client user wishes to skip certain story blocks, the navigation controls may be used to fast forward the timeline and jump to story block of choice. This provides a better user interaction as it allows the client user to experience the product by exploring it at desired pace.

In an embodiment, the master server 102 is configured to disable the navigation controls in the one or more client servers 104B-104E. As discussed, the navigation controls may be used by the client user to navigate the timeline independently of the host server 104A. However, in case the host user wishes to control the session and wishes to virtually demonstrate the product without the client user's being able to independently control its played timeline, the master server 102 allows the host user, via the host server 104A, to disable the navigation controls. In such a case, the host user may send a request to the master server 102 to disable the navigation control of the one or more client servers 104B-104E. The master server 102 may then disable the navigation controls in the respective client servers 104B-104E. This ensures that the session is controlled only by the host user, and all the client users may view the timeline as defined by the host user. This option may be utilized when the host user may not want the client user to skip any particular section of the timeline which the host user may think is important for the virtual demonstration (like, in case of training) of the product.

In an embodiment, each of the one or more client servers 104B-104E is configured to allow the associated client user to request the master server 102 to take control as a temporary host server for the session. The master server 102 is configured to confirm with the host server 104A to accept or deny the request from the client server. For example, in case a particular client user wishes to explore or point-out a certain feature of the product and wishes to share the same with other client users, that particular client user may send the request to the master server 102 via its client server to take control of the session. The request may be sent by clicking a button, like "Get Control" or the like. Once done, a notification appears on the host server 104A for the host user. The host user may accept the request which will pass over the control for the session to that particular client user, or may deny the request. Once the client user has control, the corresponding client user may navigate through the timeline as desired, and the same is mirrored on the host server 104A as well as the other client servers. In some implementations, the control may be passed around between client users associated to the one or more client servers, with the current host having the permission to pass over the control. It may be understood that at one instant, only one user may control the session.

In an embodiment, the host server 102 is configured to allow the associated host to take back control for the session from the temporary host server. As discussed, a client user may temporarily take control of the session. In such a case, the respective client server is termed as the temporary host server. However, if the host server wishes to take back the control for the session from the temporary host server, the host user may do so by using a GUI element such as, "Get Control" button to automatically return the control to itself. In such a case, the control for session is transferred back to the host server. The host user may then take control of the client's user view and perspective to guide them around the product as per the defined timeline.

Optionally, the host server is configured to allow the host user to input a remote call, with an action associated therewith, in the defined timeline during the session, and wherein the one or more client servers are configured to execute the action corresponding to the inputted remote call in the presented timeline during the session. The remote calls are also known as the remote procedure calls (RPCs). The remote calls are used in client-server-based networking applications where a computer wishes to execute a program in some memory locations located on another computer. The remote calls are well known in art and are thus, not discussed. When the host user wishes to perform certain actions on one or more client servers, the host user inputs the remote call along with the action that needs to be performed. Next the client servers read the remote call and perform the aforesaid actions. All actions that the host user wishes to perform on the one or more client servers are accomplished by the remote calls. For example, when the session is live, the remote calls are sent from the host server 104A to the one or more client servers 104B-104E.

Optionally, the action comprises one or more of focusing on a spot in the virtual environment with the model of the product, moving the camera to a fixed location in the virtual environment with the model of the product, displaying information and rich media related to the model of the product, and playing animation related to the model of the product. For instance, the host user may wish to focus a certain component of the product during its virtual demonstration; in such case, the host user may input the remote call, via the host server 104A, related to "focused view" for focusing on the spot with the desired component in the virtual environment with the model of the product, and the action is executed in the client servers 104B-104E. The client users may, thus, eventually view the focused view of the product with the component (as desired by the host user) in focus. It may be appreciated that the same action (as executed) may be replicated in the view of the host user at the host server 104A.

Optionally, each of the one or more story blocks, in the defined timeline, is related to at least one hotspot in the model of the product, and wherein each of the one or more story blocks comprises one or more of a focus view of the corresponding hotspot, a view with information about the corresponding hotspot, an interactive view to allow the associated client user to interact with the corresponding hotspot, and an animation view displaying one or more animations related to the corresponding hotspot. The hotspots are certain sections of the product. Hence, each of the one or more-story blocks in the defined timeline is associated to at least one hotspot. The hotspots provide different ways to interact with the product. In focus view, the attention of all of the one or more client users along with the host user are pulled towards the hotspot. This may simulate a stationary camera focused on the specific hotspot, with the camera virtually rotating 360 degrees to provide a full view of the hotspot. The focus view with info is the view with information about the corresponding hotspot. Herein, the actions performed may be similar to the ones performed for focus view, with information related to the component of the product focused in the hotspot added thereto. That is, along with the image or video of the corresponding hotspot, a rich media panel containing the information about the hotspot is also displayed. The information may be in the form of image, video, texts, animations etc. The event view is the interactive view to allow the associated client user to interact with the corresponding hotspot. Herein, individual events such as, but not limited to, changing basic properties of the product may be fired for the hotspot. For instance, in case the product is a BLUE-coloured car and the story block is about a colour of the car; however, the client user wishes to check out the car in RED colour, then the client user in the event view interacts with the corresponding hotspot, which in this case may be the exterior view, to change the colour from BLUE colour to the desired RED colour. The animation view displays one or more animations related to the corresponding hotspot. Generally, the animation view and the event view may not be executed as part of the timeline; however, if a client wishes to do so, then they may have an option to interact with the hotspot by employing any one of the animation view and the event view. In case the client user wishes to go back to the default view, a button for "reset view" may be pressed. This brings the corresponding client user back to the default view of the product as defined in the current story block of the timeline and closes the rich media panel if it is open.

Figure 5:
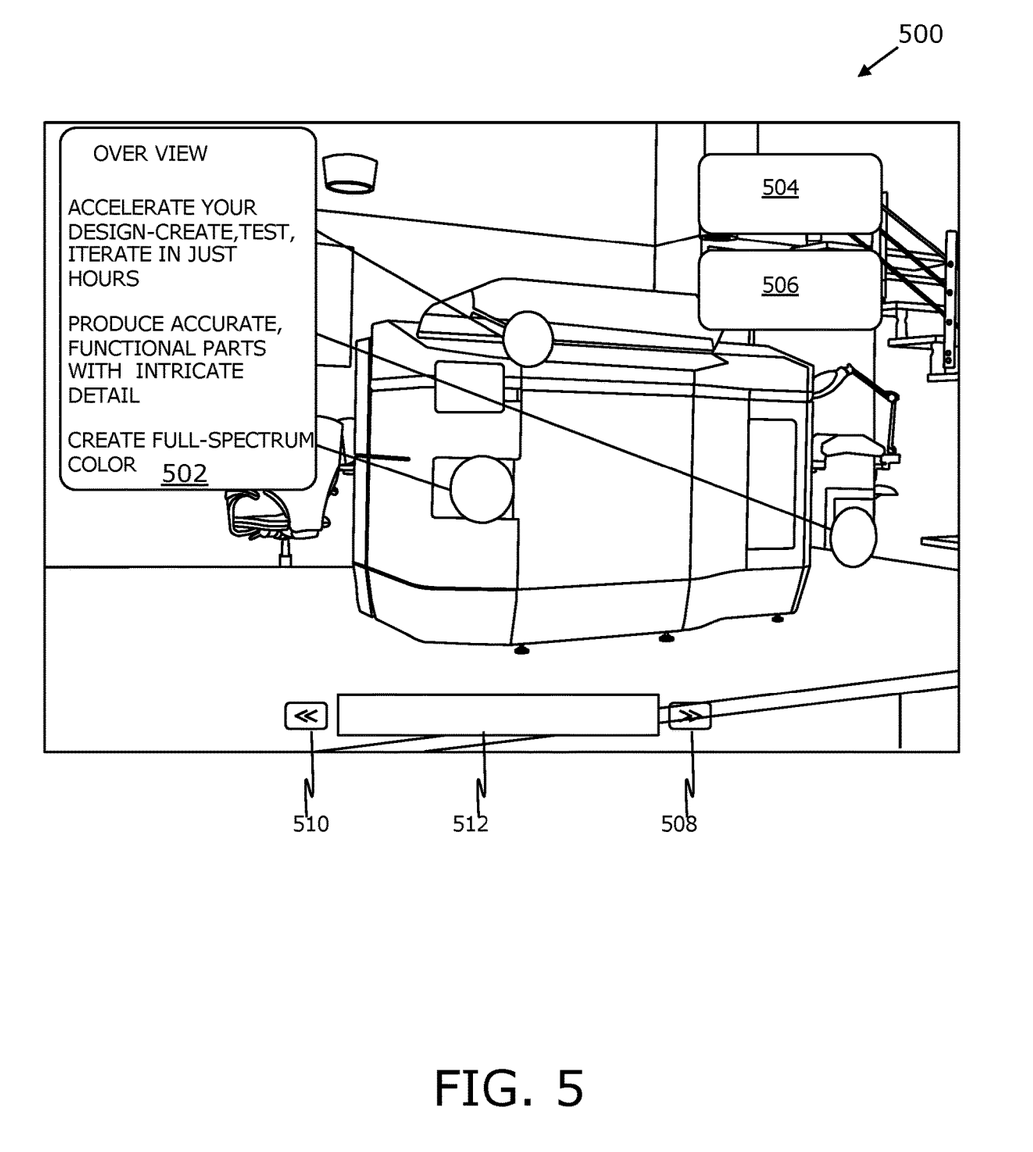
FIG. 5 is an illustration of an exemplary graphical user interface depicting view of the host server for virtual demonstration of a product, in accordance with an embodiment of the present disclosure.

Referring to FIG. 5, there is shown an illustration of an exemplary graphical user interface 500 depicting view of the host server for virtual demonstration of a product, in accordance with an embodiment of the present disclosure. In the example illustration, a hotspot related to the printer is being shown. As discussed, the host user is provided with various options to control the session of virtual demonstration of the product via the host server. As illustrated, the host server may provide a button 504, which may be labeled as "Take Control" or the like, to allow the associated host user to take back control for the session from the temporary host server (as discussed in the preceding paragraphs). The host server may further provide a button 506, which may be labeled as "Disable Navigation Control" to allow the host server to disable the navigation controls in the one or more client servers associated therewith. The host server may further provide a forward button 508 to fast forward the timeline and a backward button 510 to move backwards in the timeline. The host server may further provide a navigation bar 512 to go to the desired story block in the timeline by dragging the bar from left to right, or vice-versa.

Figure 6:
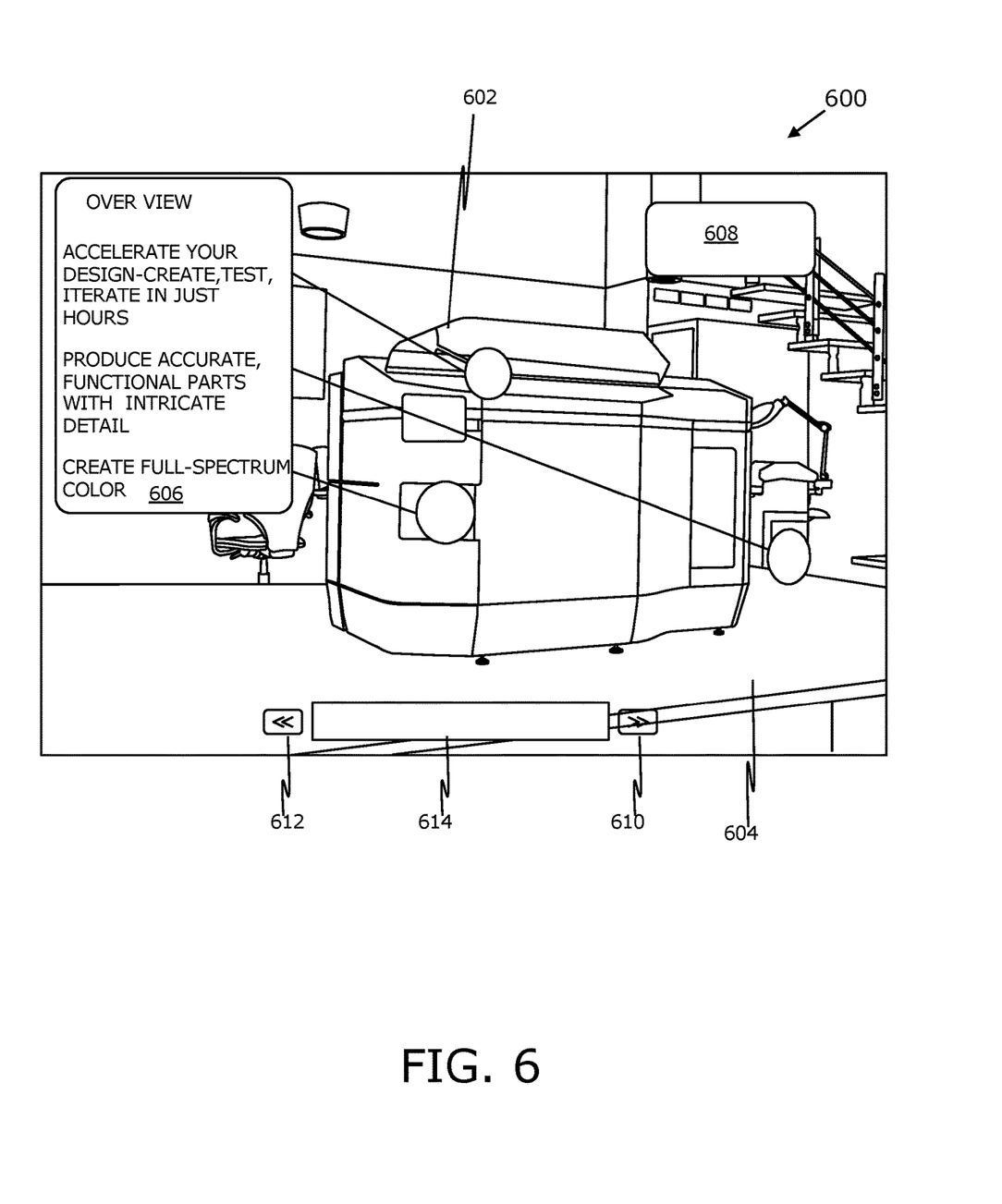
FIG. 6 is an illustration of an exemplary graphical user interface depicting view of the one or more client servers for virtual demonstration of a product, in accordance with an embodiment of the present disclosure.

Referring to FIG. 6, there is shown an illustration of an exemplary graphical user interface 600 depicting view of the one or more client servers for virtual demonstration of a product, in accordance with an embodiment of the present disclosure. The one or more client servers are configured to mirror the played timeline on the host server for viewing of the one or more client users associated therewith. In the exemplary illustration, the product (referred by the numeral 602) is a printer and a hotspot related to the printer is being mirrored in the GUI 600. Herein, the printer 602 is presented in the virtual environment 604. The one or more client servers provide an overview panel 606 to display information related to the printer. Also, as discussed, each of the one or more client servers is configured to allow the associated client user to request the master server 102 to take control as a temporary host server for the session. As illustrated, the client servers may provide a button 608, which may be labeled as "Request Control" or the like, to allow the associated client user to take control as a temporary host server for the session. The client servers may further provide a forward button 610 to fast forward the timeline and a backward button 612 to move backwards in the timeline. The client servers may further provide a navigation bar 614 to go to the desired story block in the timeline by dragging the bar from left to right, or vice-versa.

The system of the present disclosure is advantageous for virtual demonstration of a product. The two major advantages of the system 100 are eliminating of the need for the clients to physically explore the product and incorporation of game engine that eliminates the requirement of making video or capturing image of the product in the desired environment. The present system gives time and resources back to companies, which otherwise be spent on physically chasing sales across the globe, and thereby is cost-efficient and reduces the environmental impact/carbon footprint of the traditional sales approach. The present system allows a host to directly guide multiple users around a product and interact with features virtually, including but not limited to, GUI functions, static elements, and mechanical functions. This differs from existing solutions through the real-time sharing of the functions and ability to hand control over to any other user upon request, instantly enabling customers to gain deeper understanding of a product without need of physical presence, and further understanding than a general information brochure.

Moreover, the present description also relates to the method for virtual demonstration of the product as described above. The various embodiments and variants disclosed above apply mutatis mutandis to the method.

Figure 7:
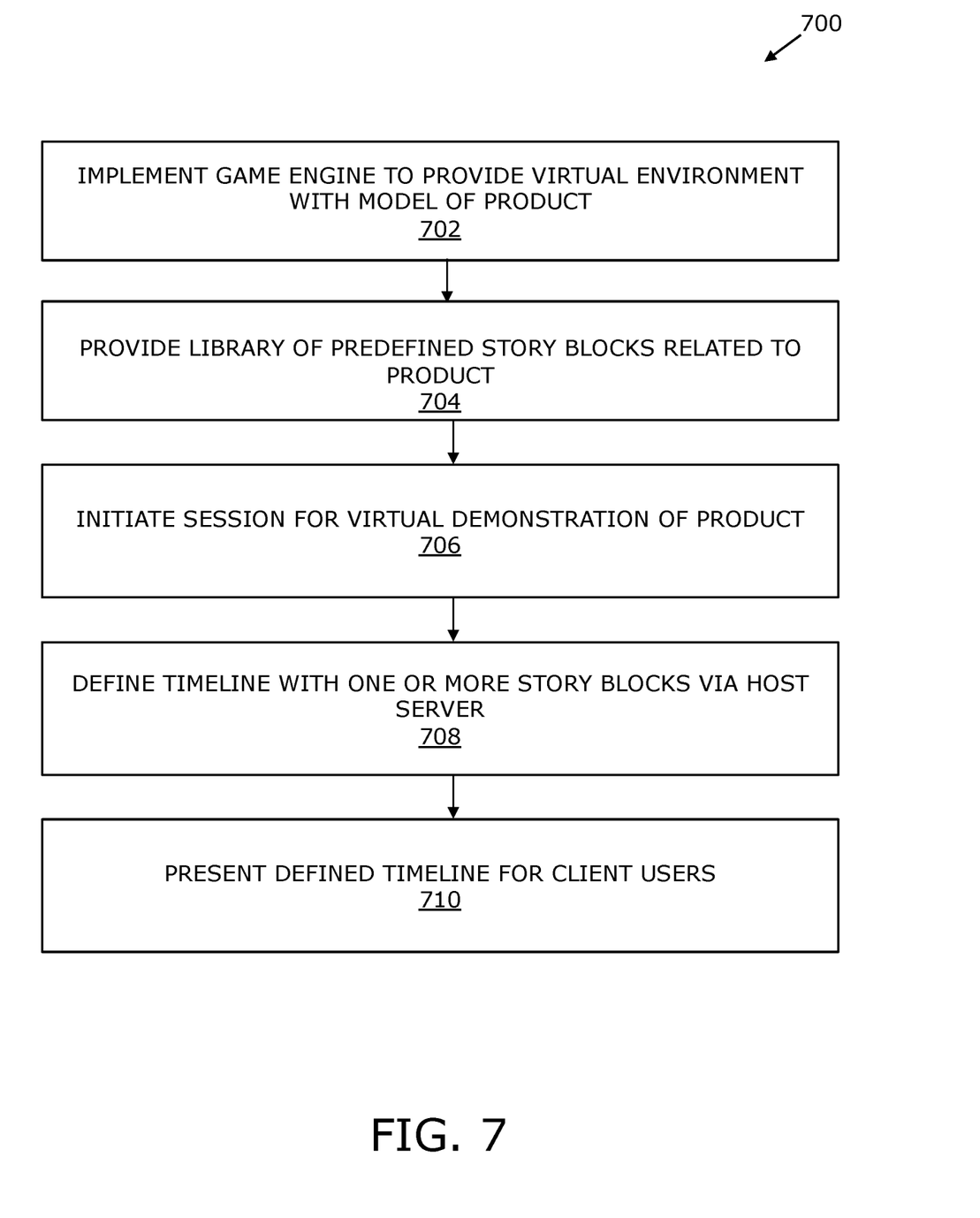
FIG. 7 is a flowchart listing steps of a method for virtual demonstration of a product, in accordance with another embodiment of the present disclosure.

Referring to FIG. 7 there is shown a flowchart 700 listing steps of a method for method for virtual demonstration of a product, in accordance with another embodiment of the present disclosure. The method includes, at a step 702, implementing a game engine to provide a virtual environment with a model of the product. The method further includes, at a step 704, providing a library of predefined story blocks related to the model of the product. The method further includes, at a step 706, initiating a session for virtual demonstration of the product over a network with a plurality of servers, defining a timeline with one or more story blocks and presenting the defined timeline for viewing of the one or more client users associated with the one or more client servers. Herein, at least one server in the plurality of servers acts as a host server in the session with the host server being associated with a host user of the virtual demonstration of the product, and one or more of other servers in the plurality of servers act as one or more client servers in the session with each of the one or more client servers being associated with a client user in the virtual demonstration of the product. The method further includes, at a step 708, defining a timeline with one or more story blocks from the library of predefined story blocks, by the host user via the host server. The timeline is defined with one or more story blocks from the library of predefined story blocks, by the host user via the host server. The method further includes, at a step 710, presenting the defined timeline for viewing of the one or more client users associated with the one or more client servers, such as to allow the client user to navigate one or more of the defined timeline and the virtual environment independently of the host server.

Optionally, the method for virtual demonstration of the product further comprises assigning an open state to the one or more client servers registered on the network, assigning a pending state to the one or more client servers requesting to join the session, assigning a closed state to the one or more client servers having joined the session and assigning the open state to the one or more client servers when the session is terminated.

Optionally, the method for virtual demonstration of the product further comprises playing the defined timeline by the host server and mirroring the played timeline on the host server by the one or more client servers for viewing of the one or more client users associated therewith.

Optionally, the method for virtual demonstration of the product further comprises providing one or more graphical user interface (GUI) elements for the associated client user with each of the one or more client servers and dynamically adjusting the one or more GUI elements based on the story block being currently presented in the timeline.

Optionally, the method for virtual demonstration of the product further comprises allowing the associated client user with each of the one or more client servers to request to take control as a temporary host server for the session and confirming with the host server to accept or deny the request from the client server.

Modifications to embodiments of the present disclosure described in the foregoing are possible without departing from the scope of the present disclosure as defined by the accompanying claims. Expressions such as "including", "comprising", "incorporating", "have", "is" used to describe and claim the present disclosure are intended to be construed in a non-exclusive manner, namely allowing for items, components or elements not explicitly described also to be present. Reference to the singular is also to be construed to relate to the plural.

Although the present invention has been described with reference to specific features and embodiments thereof, it is evident that various modifications and combinations can be made thereto without departing from the spirit and scope of the invention. The specification and drawings are, accordingly, to be regarded simply as an illustration of the invention as defined by the appended claims, and are contemplated to cover any and all modifications, variations, combinations or equivalents that fall within the scope of the present invention

The invention claimed is:

1. A system for virtual demonstration of a product, the system comprising:
  a master server configured to implement a game engine to provide a virtual environment with a model of the product, the master server further configured to a provide a library of predefined story blocks related to the model of the product; and
  a plurality of servers in communication with the master server to initiate a session for virtual demonstration of the product over a network,
  wherein at least one server in the plurality of servers acts as a host server in the session with the host server being associated with a host user of the virtual demonstration of the product, and one or more of other servers in the plurality of servers act as one or more client servers in the session with each of the one or more client servers being associated with a client user in the virtual demonstration of the product,
  wherein the host server is configured to allow the host user to define a timeline with one or more story blocks from the library of predefined story blocks, and
wherein the one or more client servers are configured to present the defined timeline for viewing of the one or more client users associated therewith and allow the client user to navigate one or more of the defined timeline and the virtual environment independently of the host server.

2. The system according to claim 1, wherein the master server is configured to:
  assign an open state to the one or more client servers registered on the network;
  assign a pending state to the one or more client servers requesting to join the session;
  assign a closed state to the one or more client servers having joined the session; and
  assign the open state to the one or more client servers when the session is terminated.

3. The system according to claim 1, wherein the host server is configured to play the defined timeline, and wherein the one or more client servers are configured to mirror the played timeline on the host server for viewing of the one or more client users associated therewith.

4. The system according to claim 1, wherein each of the one or more client servers provide one or more graphical user interface (GUI) elements for the associated client user, and wherein the one or more GUI elements are dynamically adjusted based on the story block being currently presented in the timeline.

5. The system according to claim 4, wherein the one or more GUI elements comprise one or more navigation controls configured to allow the client user to navigate one or more of the defined timeline and the virtual environment independently of the host server, and wherein the master server is configured to disable the navigation controls in the one or more client servers.

6. The system according to claim 1, wherein each of the one or more client servers is configured to allow the associated client user to request the master server to take control as a temporary host server for the session, and wherein the master server is configured to confirm with the host server to accept or deny the request from the client server.

7. The system according to claim 6, wherein the host server is configured to allow the associated host to take back control for the session from the temporary host server.

8. The system according to claim 1, wherein the host server is configured to allow the host user to input a remote call, with an action associated therewith, in the defined timeline during the session, and wherein the one or more client servers are configured to execute the action corresponding to the inputted remote call in the presented timeline during the session.

9. The system according to claim 8, wherein the action comprises one or more of focusing on a spot in the virtual environment with the model of the product, moving the camera to a fixed location in the virtual environment with the model of the product, displaying information and rich media related to the model of the product, and playing animation related to the model of the product.

10. The system according to claim 1, wherein each of the one or more story blocks, in the defined timeline, is related to at least one hotspot in the model of the product, and wherein each of the one or more story blocks comprises one or more of: a focus view of the corresponding hotspot, a view with information about the corresponding hotspot, an interactive view to allow the associated client user to interact with the corresponding hotspot, and an animation view displaying one or more animations related to the corresponding hotspot.

11. The system according to claim 1, wherein each of the plurality of servers is a virtual private server.

12. The system according to claim 11, wherein the plurality of servers are part of Reliable Server Pooling (RSerPool) computer protocol framework.

13. The system according to claim 1, wherein the game engine is a Unity game engine.

14. A method for virtual demonstration of a product, the method comprising:
  implementing a game engine to provide a virtual environment with a model of the product;
  providing a library of predefined story blocks related to the model of the product;
  initiating a session for virtual demonstration of the product over a network with a plurality of servers, wherein at least one server in the plurality of servers acts as a host server in the session with the host server being associated with a host user of the virtual demonstration of the product, and one or more of other servers in the plurality of servers act as one or more client servers in the session with each of the one or more client servers being associated with a client user in the virtual demonstration of the product, defining a timeline with one or more story blocks from the library of predefined story blocks, by the host user via the host server; and presenting the defined timeline for viewing of the one or more client users associated with the one or more client servers, such as to allow the client user to navigate one or more of the defined timeline and the virtual environment independently of the host server.

15. The method according to claim 14, further comprising:

assigning an open state to the one or more client servers registered on the network;

assigning a pending state to the one or more client servers requesting to join the session;

assigning a closed state to the one or more client servers having joined the session; and assigning the open state to the one or more client servers when the session is terminated.

16. The method according to claim 14, further comprising:

playing the defined timeline by the host server; and mirroring the played timeline on the host server by the one or more client servers for viewing of the one or more client users associated therewith.

17. The method according to claim 14, further comprising:

providing one or more graphical user interface (GUI) elements for the associated client user with each of the one or more client servers; and dynamically adjusting the one or more GUI elements based on the story block being currently presented in the timeline.

18. The method according to claim 14, further comprising:

allowing the associated client user with each of the one or more client servers to request to take control as a temporary host server for the session; and confirming with the host server to accept or deny the request from the client server.

* * * * *